US011196549B2

United States Patent
Ponnusamy et al.

(10) Patent No.: US 11,196,549 B2
(45) Date of Patent: *Dec. 7, 2021

(54) KEY RECOVERY SYSTEM

(71) Applicant: Dell Products L.P., Round Rock, TX (US)

(72) Inventors: Vigneswaran Ponnusamy, Round Rock, TX (US); Chitrak Gupta, Karnataka (IN); Sanjeev S. Dambal, Austin, TX (US); Charles Stracener, Carrollton, TX (US); Sanjay Rao, Austin, TX (US); Diwahar Natarajan, Round Rock, TX (US); Sushma Basavarajaiah, Bangalore (IN); Rama Rao Bisa, Bangalore (IN); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 437 days.

This patent is subject to a terminal disclaimer.

(21) Appl. No.: 16/262,132

(22) Filed: Jan. 30, 2019

(65) Prior Publication Data

US 2020/0244445 A1 Jul. 30, 2020

(51) Int. Cl.
*H04L 9/08* (2006.01)
*G06F 13/20* (2006.01)
*G06F 21/57* (2013.01)

(52) U.S. Cl.
CPC .............. *H04L 9/083* (2013.01); *G06F 13/20* (2013.01); *G06F 21/572* (2013.01); *H04L 9/0894* (2013.01); *G06F 2221/034* (2013.01)

(58) Field of Classification Search
CPC ....................................................... H04L 9/083
See application file for complete search history.

(56) References Cited

U.S. PATENT DOCUMENTS

| 10,795,581 | B2* | 10/2020 | Gupta | G06F 3/0683 |
|---|---|---|---|---|
| 2003/0023826 | A1* | 1/2003 | McMichael | G06F 3/0601 |
| | | | | 711/173 |
| 2007/0005951 | A1* | 1/2007 | Davis | G06F 21/31 |
| | | | | 713/2 |
| 2010/0106928 | A1* | 4/2010 | Toda | G06F 12/1458 |
| | | | | 711/163 |

(Continued)

*Primary Examiner* — Simon P Kanaan
(74) *Attorney, Agent, or Firm* — Joseph Mencher (57) ABSTRACT

A key retrieval system includes a management system and a managed system that is coupled to the management system through a network. The managed system includes a managed device, a management system configuration storage, a remote access controller device that stores a management system configuration for the management system in the management system configuration storage and provides a key management client subsystem that is configured to use the management system configuration to access the management system. The managed system also includes a BIOS. The BIOS detects an event that triggers unlocking the managed device. The BIOS determines that the remote access controller device is unavailable and, in response, retrieves the management system configuration and accesses the management system using the management system configuration. The BIOS then retrieves the locking key from the management system and unlocks the managed device using the locking key.

20 Claims, 5 Drawing Sheets

(56) References Cited

U.S. PATENT DOCUMENTS

| | | | |
|---|---|---|---|
| 2010/0111309 A1 | 5/2010 | Khatri et al. | |
| 2011/0307709 A1* | 12/2011 | Cox | G06F 21/80 713/183 |
| 2015/0121028 A1* | 4/2015 | Gupta | G06F 21/78 711/164 |
| 2020/0241747 A1* | 7/2020 | Gupta | G06F 3/0622 |

* cited by examiner

KEY RECOVERY SYSTEM

BACKGROUND

The present disclosure relates to generally to information handling systems, and more particularly recovering keys used to access devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems, and/or other computing devices known in the art, typically include enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system.) However, the use of such network-based key management systems can raise issues. For example, when the remote access controller becomes unavailable or un-operational, device locking key(s) may be inaccessible via the out-of-band methods discussed above.

In a specific example, server systems may be managed in order to update firmware, restore platforms, retrieve server event/error logs, retrieve or update boot configuration data, and/or provide for a variety of other server management activities known in the art. Many server systems are provided with a remote access controller (e.g., a Dell Remote Access Controller (DRAC) or integrated DRAC (iDRAC) available from DELL® Inc. of Round Rock, Tex., United States) that performs much of the management of the server systems and its associated management data (e.g., firmware image data, platform restore data, server event/error logs, boot configuration data, access/read storage devices, etc.). Furthermore, in some situations, Operating System (OS) applications may utilize an in-band communication link to perform the management of the server systems and their management data described above.

However, managed device(s) such as bootable storage device(s) or drive(s) that are utilized in the booting or other initialization of the server systems may often be locked via the device locking key(s) (e.g., storage device locking keys) discussed above. With those storage device locking key(s) stored on the key management system, the booting, startup, resetting, and/or other initialization operations for the server system cannot be performed in the event that the remote access controller is unavailable or unable to retrieve the storage device locking key(s) that are required to unlock of the storage device(s) that store the data needed to initialize the server system, preventing those server systems from initializing until the remote access controller is once again available or able to retrieve the storage device locking key(s).

Accordingly, it would be desirable to provide an improved key management system.

SUMMARY

According to one embodiment, an Information Handling System (IHS) includes a processing system; and a memory system that is coupled to the processing system and that includes instructions that, when executed by the processing system, causes the processing system to provide a Basic Input/Output System (BIOS) that is configured to: detect an event that triggers unlocking of a managed device; determine that a remote access controller device is unavailable, wherein the remote access controller is configured, when the remote access controller is available, to provide a key management client subsystem that accesses a management system using a management system configuration in order to retrieve a locking key for use in unlocking the managed device; retrieve, in response to detecting the event and determining that the remote access controller is unavailable, the management system configuration; access the management system using the management system configuration; retrieve the locking key from the management system; and unlock the managed device using the locking key.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
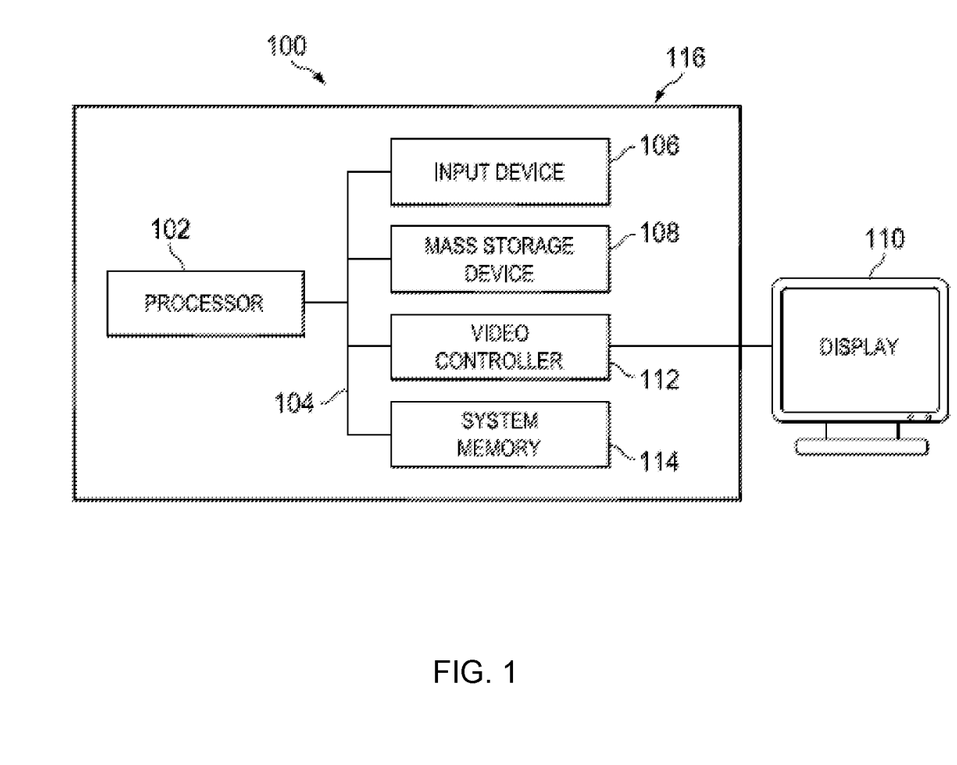
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
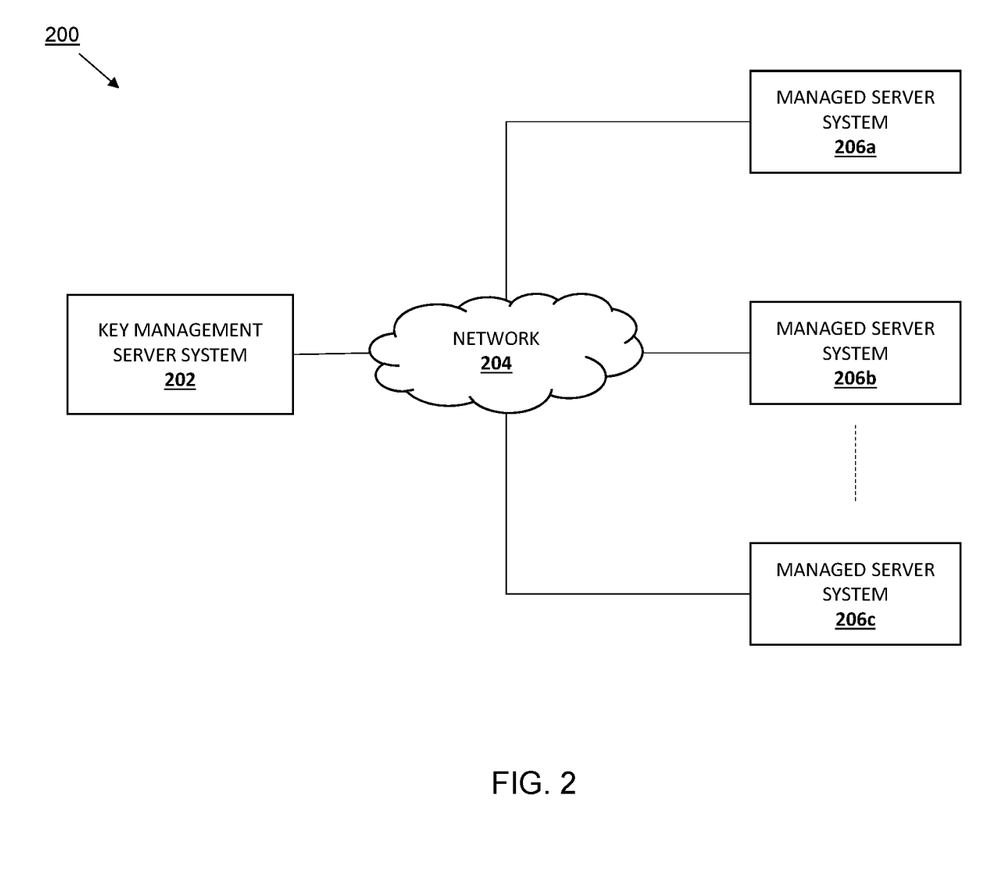
FIG. 2 is a schematic view illustrating an embodiment of a key recovery system.

Referring now to FIG. 2, an embodiment of a key management system 200 is illustrated. As discussed herein, the key management system 200 includes a management system that may be provided by one or more of the IHSs 100 discussed above with reference to FIG. 1, and/or that may include any or all of the components of the IHS 100. In the illustrated embodiment, the management system is provided by or implemented in a key management server system 202 that may include one or more server devices, although other computing devices may be utilized to provide the management system while remaining within the scope of the present disclosure as well. In a specific example, the key management server system 202 includes one or more server devices that are configured according to the Key Management Interoperability Protocol (KMIP), which one of skill in the art in possession of the present disclosure will recognize is an extensible communication protocol that defines message formats for the manipulation of cryptographic keys via server device(s) providing the key management server system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management server system 202 is coupled to the network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by or implemented in managed server systems 206*a*, 206*b*, and up to 206*c*, each of which is coupled through the network 204 to the key management server system 202. While one of skill in the art in possession of the present disclosure will recognize that the embodiments discussed herein describe a datacenter including a datacenter network that couples together the key management server system and the managed server systems, any of a variety of managed systems may be coupled to a management system via a network while operating according to the teachings of the present disclosure, and those embodiments are envisioned as falling within the scope of the present disclosure as well.

Figure 3:
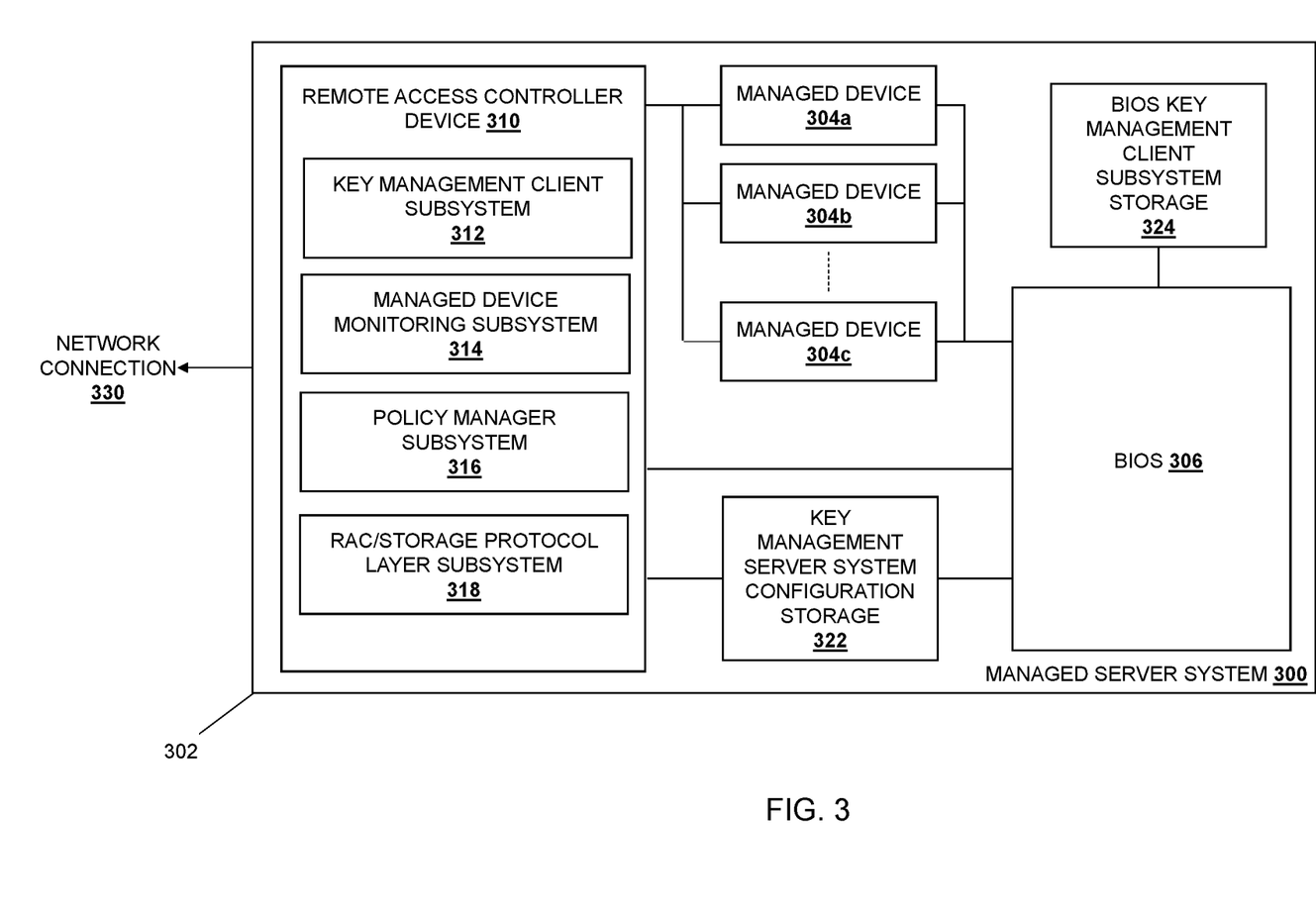
FIG. 3 is a schematic view illustrating an embodiment of a server system used in the key recovery system of FIG. 2.

Referring now to FIG. 3, a managed server system 300 is illustrated according to some embodiments. The managed server system 300 may be any or all of the managed server systems 206*a-c* discussed above with reference to FIG. 2 and, as such, may be provided by the IHS 100 discussed above with reference to FIG. 1, and/or may include any or all of the components of the IHS 100. According to some embodiments, the managed server system 300 may be provided by a server device, a networking device (e.g., a switch device, a router device, etc.), a desktop computing device, a laptop/notebook computing device, and/or a variety of other computing devices that would be apparent to one of skill in the art in possession of the present disclosure. In the illustrated embodiment, a chassis 302 houses the components of the managed server system 300, only some of which are illustrated in FIG. 3. However, while a single managed server system is described herein, one of skill in the art in possession of the present disclosure will recognize that a chassis may house multiple managed server systems that are substantially similar to the managed server system 300 while remaining within the scope of the present disclosure as well. The managed server system 300 may include at least one processing system and at least one memory system (not illustrated but may include the processor 102 and the memory 114, respectively, discussed above with reference to FIG. 1, as well as other components with similar functionalities). The at least one memory system may be coupled to the at least one processing system and may include instructions that, when executed by the at least one processing system, cause the at least one processing system to provide a Basic In/Output System (BIOS) 306 that is configured to perform the functionality of the BIOS discussed below, as well as to recover locking keys of managed devices 304*a-c* as described herein.

In the illustrated embodiment, the managed server system 300 may include a plurality of managed devices 304*a*, 304*b*, and up to 304c. In the examples provided herein, the managed devices 304a-c are provided by or implemented in storage devices such as, for example, bootable storage devices that may store data which the managed server system 300 may be configured to utilize in order to boot, start up, reset, or otherwise initialize. However, one of skill in the art in possession of the present disclosure will recognize that the managed devices 304a-c may be provided by any devices that are configured to be locked and unlocked using the locking keys provided by the key management server system 202 as described herein. In some embodiments, the managed devices 304a-c may be distinguished from each other using identifying information such as key identifiers that may include, for example, universally unique identifiers (UUID)s and/or other identifying information known in the art that is configured to distinguish one managed device from other managed devices.

In the illustrated embodiment, the managed server system 300 may also include a remote access controller device 310 that provides a first managed device locking system for the managed server system 300 that, as discussed below, operates via an out-of-band network. In the illustrated embodiment, the remote access controller device 310 is coupled to each of the managed devices 304a-c, a key management server system configuration storage 322, and the BIOS 306. In a specific example, the remote access controller device 310 may be provided by or implemented in the iDRAC discussed above that is operably coupled to or embedded within the managed server system 300. Furthermore, the remote access controller device 310 may be remotely accessed by an administrator via the out-of-band network to deploy, monitor, configure, update, troubleshoot, remediate, and/or otherwise manage the managed server system 300 from any location, and without the use of agents. The remote access controller device 310 may include a remote access controller processing system (not illustrated, but which may include the processor 102 discussed above with reference to FIG. 1) and a remote access controller memory system (not illustrated, but which may include the memory 114 discussed above with reference to FIG. 1) that includes instructions that, when execute by the remote access controller processing system, cause the remote access controller processing system to provide a remote access controller engine that is configured to perform the functionality of the remote access controller engines and remote access controller devices discussed below.

In the illustrated embodiment, the remote access controller device 310 includes a key management client subsystem 312 that is provided by or implemented in a KMIP client that is configured to retrieve the locking keys of the managed devices 304a-c from the key management server system 202, which allows the remote access controller device 310 to perform the key management and unlocking functionality of the first managed device locking system discussed herein. The remote access controller device 310 also includes a managed device monitoring subsystem 314, which may be provided by a boot storage device monitor, and which may be configured to monitor the managed devices 304a-c and/or perform any of the other managed device monitoring system functionalities discussed herein.

The remote access controller device 310 also includes a policy manager subsystem 316. As discussed above, the key management system operating using the KMIP protocol in order to provide for key management between a compliant managed server system 300 (e.g., a KMIP client) and the key management server system 202 (e.g., a KMIP server). The KMIP specification describes the management of keys by a key server that can support key generation, registration of keys using attributes, key retrieval, and key deletion. However, the KMIP specification does not define policies to provide for the management of key life, key rotation, key-to-device mapping, key recovery, key redundancy, key affinity, and/or any other key management policy configurations that would be apparent to one of skill in the art in possession of the present disclosure. However, such key management policy configurations may be licensable and may be provided as part of a key management system offering and, in some embodiments of the present disclosure, the policy manager subsystem 316 may provide for the management of these key management policy configurations based on the KMIP specification.

In one embodiment, the policy manager subsystem 316 may include a software block that may be integrated in the remote access controller device 310 along with the key management infrastructure (e.g., the key management client subsystem 312, the managed device monitoring subsystem 314, and a Remote Access Controller (RAC)/storage protocol layer system 318). For example, the policy manager subsystem 316 may be a unique component that is configured to control multiple functionalities for key management from the perspective of the managed server system 300 including the exposing of a set of Application Programming Interfaces (APIs) to be used by the remote access controller device 310, as well as other key management functionalities that would be apparent to one of skill in the art in possession of the present disclosure. In various embodiments, the policy manager subsystem 316 may utilize a local database such as, for example, an embedded database included in the remote access controller device 310, or its own internal database included in the policy manager subsystem 316, in order to store key management policy configurations. While described herein as managing the policies of the managed server system 300, one of skill in the art in possession of the present disclosure will recognize that the policy manager subsystem 316 may perform an enhanced role of a group policy manager in order to manage policies of a group of managed server system 300 (e.g., a group that includes the managed server system 206a, the managed server system 206b, and/or up to the managed server system 206c) while remaining within the scope of the present disclosure as well.

While not illustrated, the policy manager subsystem 316 may include at least one interface API. For example, the at least one interface API may provide for the display of a remote access controller graphical user interface and/or a command line interface that are configured to allow access to the policy manager subsystem 316 such that an administrator may view the key management policy configurations, provide instructions to the policy manager subsystem 316, and/or perform any other administrator functionality that would be apparent to one of skill in the art in possession of the present disclosure. In various embodiments, the policy manager subsystem 316 may include a configuration manager that operates to control and store configuration parameters (e.g., values, attributes, etc.) for the key management policy configurations in the local database. In a specific example, the interface APIs discussed above may be used to get/set/reset values for the configuration parameters discussed above.

The policy manager subsystem 316 may also include a policy engine that is configured to direct the key management policy configurations discussed above. For example, the policy engine may read the policy configurations, and may perform actions based on the configuration parameters included in those policy configurations. In some embodiments, the policy manager subsystem 316 may include a database manager that may be configured to maintain a key pool and provide the policy engine with related key identifiers that allow for the retrieval of keys from the key management server system 202 using the key management client subsystem 312. In various embodiments, the policy manager subsystem 316 may include a group management engine that may provide a configurable option in the policy manager subsystem 316 that, when enabled, allows the policy engine to work as a group policy manager (as well as a local policy manager) in order to manage the policies of a group of managed server systems (e.g., two or more of the managed server systems 206a-206c).

In various embodiments, the policy engine provided by the policy manager subsystem 316 may perform key lifetime and/or key rotation policy configurations. For example, a key lifetime may be adjusted according to an organization policy and may be defined in the key management policy configurations. Furthermore, the policy engine may create a pool of keys and key identifiers, may request that the key management server system 202 generate a specific number of keys for the managed server system 300, and may store the key identifiers (e.g., UUIDs) for the keys generated by the key management server system 202 in the local database. The policy engine may also request a new key after the lifetime of a previous key has expired and remove the previous key from the local database.

In various embodiments, the policy engine provided by the policy manager subsystem 316 may perform key-to-managed-device mapping according to a managed device mapping policy configuration. For example, the managed device mapping policy configuration may dictate whether a single key is applied to multiple managed devices 304a-c, whether each device group will have a unique key, whether a single key is applied to each managed devices 304a-c, and/or a variety of other mapping policy configurations that would be apparent to one of skill in the art in possession of the present disclosure. The policy engine may also create managed device specific databases in the local database and create a pool of keys for each managed device type and manage the key rotation for each key in that pool.

In various embodiments, the policy engine provided by the policy manager subsystem 316 may provide key redundancy and/or key recovery according to key redundancy and/or key recovery policy configurations. For example, the policy engine may set the policy for a redundancy scheme for the remote access controller. As would be understood by one of skill in the art in possession of the present disclosure, different redundancy schemes may be available, and the choice for the policy (e.g., global or local) may be dictated by the policy manager subsystem 316. Similarly, the policy engine provided by the policy manager subsystem 316 may set the key management policy configurations for key recovery for the remote access controller device 310. As would be understood by one of skill in the art in possession of the present disclosure, different key recovery schemes may be available, and the choice for the key management policy configuration may be dictated by the policy manager subsystem 316. In some embodiments, the policy manager subsystem 316 may be configured to enable and/or disable the key recovery system and methods described herein.

In various embodiments, the policy engine provided by the policy manager subsystem 316 may provide a key affinity policy according to a key affinity policy configuration. As would be understood by one of skill in the art in possession of the present disclosure, key affinity is the property by which a key can be bound to a managed server system or a group of managed server systems. In an embodiment, a machine affinity policy, a group affinity policy, and/or any other affinity policy may be defined by the policy manager subsystem 316. For example, the machine affinity policy may tie a managed device 304a, 304b, and/or up to 304c to a managed server system such that that managed device cannot be moved to another managed server system. In another example, the enabled group affinity policy may allow managed devices 304a-304c to be moved between managed server systems in a group (e.g., if the group management engine takes over from the policy manager subsystem 316, a token may be distributed to all the participating managed server systems in the group, and that token may be used for registering the keys, which will enable the group affinity and tie the managed device 304a, 304b, and/or 304c to the group.) The policy engine may be configured to enforce the machine affinity policy, with the managed devices 304a-304c allowed to move from one managed server system to another managed server system without restrictions when the machine affinity policy is not enforced (for this to happen, the policy engine may instruct the key management client subsystem 312 to not register the key using any system or group level attribute.)

While the policy manager subsystem 316 is described as being provided by the remote access controller device 310 included in the managed server system 300, in other embodiments the key management server system 202 may provide the policy manager subsystem 316 (or a portion of the policy manager subsystem 316.) As such, the key management server system 202 may take up the additional responsibility of maintaining policy enforcement at the group level. Furthermore, each group of managed server systems may have a different policy configuration for key lifecycle management, and that policy configuration may be enforced by a group policy manager at the key management server system 202. In various embodiments, group policy may take precedence such that policy configurations local to the managed server system (e.g., a machine affinity policy configuration) may be overridden by the group policy manager at the key management server system 202. In other examples, the group policy manager may take over the key redundancy policy by replicating the group UUID databases for recovery. However, in such examples, the managed server system 300 may include a group UUID database as well. While a specific policy manager subsystem 316 has been illustrated and described, one of skill in the art in possession of the present disclosure will recognize that the policy manager subsystem 316 may perform other functionalities and provide for the enforcement of other policies while remaining within the scope of the present disclosure as well.

In various embodiment, the remote access controller device 310 may also include a Remote Access Controller (RAC)/storage protocol layer system 318 that is configured to provide a protocol layer between the remote access controller device 310 and a storage controller of the storage devices, as well as perform any of the other RAC/storage protocol layer subsystem 318 functionality discussed herein. While specific systems and functionalities of the remote access controller device 310 have been illustrated and described, one of skill in the art in possession of the present disclosure will recognize that the functionalities described herein may be provided via a variety of different systems and/or subsystem configurations while remaining within the scope of the present disclosure as well.

In the illustrated embodiment, the managed server system 300 also includes the BIOS 306 that provides a second managed device locking system for the managed server system 300 via an in-band network. As illustrated, the BIOS 306 may be coupled to the managed devices 304a-c, the remote access controller device 310, the key management server system configuration storage 322, and a BIOS key management client subsystem storage 324 that, as discussed below, stores data for providing a version of the key management client subsystem 312 that may be used by the BIOS 306 (e.g., a "BIOS key management client subsystem"). As would be understood by one of skill in the art in possession of the present disclosure, the BIOS 306 may be provided by or implemented in non-volatile firmware and may be used to perform hardware initialization during a booting process (e.g., power-on startup) for the managed server system 300. Furthermore, while discussed as a BIOS herein, one of skill in the art in possession of the present disclosure will recognize that the BIOS 306 may be provided according to the Unified Extensible Firmware Interface (UEFI) specification, which defines a software interface between an operating system and platform firmware in the managed server system 300, and was provided to replace the BIOS firmware interface while providing legacy support for BIOS services. As such, the BIOS 306 may include a BIOS processing system and a BIOS memory system that is coupled to the BIOS processing system and includes instructions that, when executed by the BIOS processing system, causes the BIOS processing system to perform the functionality discussed herein. However, while a specific managed server system 300 has been illustrated and described, one of skill in the art in possession of the present disclosure will recognize that server systems may include a variety of components and/or component configurations while remaining within the scope of the present disclosure as well.

In some embodiments, the BIOS 306 may be configured to perform functions including, for example, monitoring, accessing, reading, retrieving, and/or writing functions with respect to a component or a subsystem within the managed server system 300. For example, the BIOS 306 may monitor an availability status of components and subsystems in the managed server system 300, put unresponsive components or subsystems to sleep, and/or perform other functionality that would be apparent to one of skill in the art in possession of the present disclosure. In a specific example, the BIOS 306 may, routinely or upon request, send communication requests to the remote access controller device 310, and depending upon whether acknowledgment(s) are received from the remote access controller device 310, determine the availability status of the remote access controller device 310.

The managed server system 300 may also include a storage system that, in the illustrated embodiment, is provided by the key management server system configuration storage 322 and is configured to store a key management server system configuration that may be utilized by the key management client subsystem 312 to access the key management server system 202. For example, the key management server system configuration may include credentials that may be utilized by the key management client subsystem 312 each time the key management client subsystem 312 logs into the key management server system 202. In other embodiments, the key management server system configuration may include device identifiers of the key management server system 202, authentication certificates, and/or other configuration information that would be apparent to one of skill in the art in possession of the present disclosure. In various embodiments, the key management server system configuration storage 322 is configured to store the key identifiers for the managed devices 304a-c. For example, the key identifiers for the managed devices 304a-c may be stored in the form of a data structure that is configured to manage the encryption and/or authentication of those key identifiers for the managed devices 304a-c. In a specific example, a data structure for storing authentication information may include a plurality of tables having a user identifier portion, a user device identifier portion, a physical key identifier portion, and a generic device identifier portion. However, in other embodiments, the key identifiers may be stored in a key identifier storage (not illustrated) that is separate from the key management server system configuration storage 322.

According to some embodiments, the key management server system configuration storage 322 may be provided by or implemented in a shared Non-Volatile Random-Access Memory (NVRAM) device such as, for example, a restore Serial Peripheral Interface (rSPI) flash drive, an rSPI card, and/or other storage devices known in the art. In other examples, the key management server system configuration storage 322 may be provided by or implemented with a dedicated, reserved Non-Volatile Memory express (NVMe) device namespace storage, and may be managed using an NVMe Local Key Management (LKM) self-encryption feature which is configured to support creation, deletion, change, importing, and/or other operations on the key management server system configuration. Furthermore, the key management server system configuration storage 322 may be configured to securely store the key management server system configuration and/or the key identifiers for use in the manners described herein.

According to some embodiments, the key management server system configuration storage 322 may be an off-motherboard storage device that is coupled to the motherboard of the managed server system 300. For example, the key management server system configuration storage 322 may be integrated into the motherboard of the managed server system 300 and coupled to the processing system. In a specific example, the key management server system configuration storage 322 may be a rSPI flash drive or rSPI card that is provided with a circuit board having an SPI connector that enables the drive or card to be connected to/disconnected from the SPI connector, and may include a storage space and/or other modules for providing the functionalities discussed herein. In some embodiments, the SPI connector (or other external connector) may be mounted on the motherboard and accessible on an outer surface of the chassis 302 of the managed server system 300 (e.g., accessible on a front panel of the chassis 302), while being coupled to the remote access controller device 310 via a coupling (e.g., one or more traces) provided on the motherboard. While a few specific examples have been described, one of skill in the art in possession of the present disclosure will recognize that the key management server system configuration storage 322 may be provided by a variety of storage systems while remaining within the scope of the present disclosure as well.

The managed server system 300 may also include a storage system that, in the illustrated embodiment, is provided by the BIOS key management client subsystem storage 324 that is configured to store a BIOS key management client subsystem that, as discussed above, includes data for providing a BIOS version of the key management client subsystem 312 used by the remote access controller device 310 to access the key management server system 202 (e.g., a "BIOS KMIP client"). In various examples, the BIOS key management client subsystem storage 324 may be a software repository that is managed by a repository manager such as the Dell Repository Manager (DRM) available from DELL® Inc. of Round Rock, Tex., United States. As such, the BIOS key management client subsystem storage 324 may be a local storage location that is not locked by the device locking keys described herein, a mapped network shared storage location, a common internet file system (CIFS) shared storage location, and/or any other storage location that would be apparent to one of skill in the art in possession of the present disclosure. In various embodiments, the BIOS 306 may be configured to retrieve the BIOS key management client subsystem from the repository manager and launch the BIOS key management client subsystem during a boot process.

In the illustrated embodiment, the managed server subsystem(s) may include processing systems (e.g., central processing units (CPUs), network processing units (NPUs), etc.), memory systems, storage systems, display systems, and/or any other server subsystem that would be apparent to one of skill in the art in possession of the present disclosure. The chassis 302 may also house a communication system (not illustrated) that is coupled to the remote access controller device 310 and the BIOS 306 (e.g., via a coupling between the communication system and the processing system), and that may include a NIC, a wireless communication system (e.g., a BLUETOOTH® communication system, a WiFi communication system, a Near Field Communication (NFC) system, etc.), and/or a variety of other communication components that would be apparent to one of skill in the art in possession of the present disclosure. The communication system may provide a network connection 330 to the network 204, and that network connection 330 may include an in-band network connection to the network 204 that provides a network connection for the BIOS 306, as well as an out-of-band network connection that is a separate network connection provided for the remote access controller device 310. While the embodiments herein discuss the key management functionality as being performed by the managed server system 300, one of skill in the art in possession of the present disclosure will recognize that other devices may benefit from the teachings of the present disclosure and thus will fall within its scope. Furthermore, while a specific server system has been described, one of skill in the art in possession of the present disclosure will recognize that server systems may include a variety of components other than those illustrated in order to provide conventional server system functionalities, as well as the functionalities discussed herein, while remaining within the scope of the of the present disclosure.

Figure 4A:
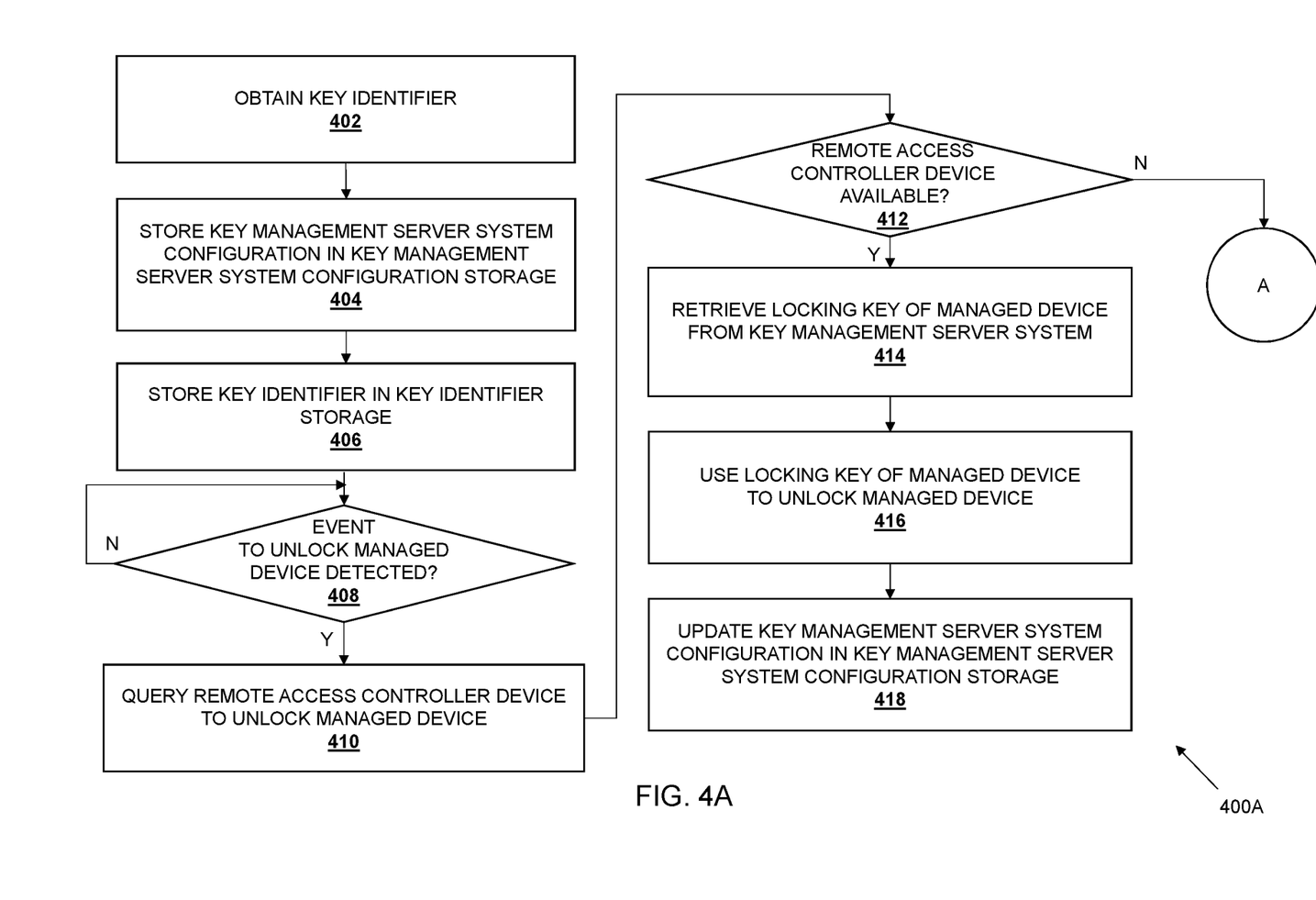
FIGS. 4A and 4B are flow charts illustrating an embodiment of a method for recovering keys.
Figure 4B:
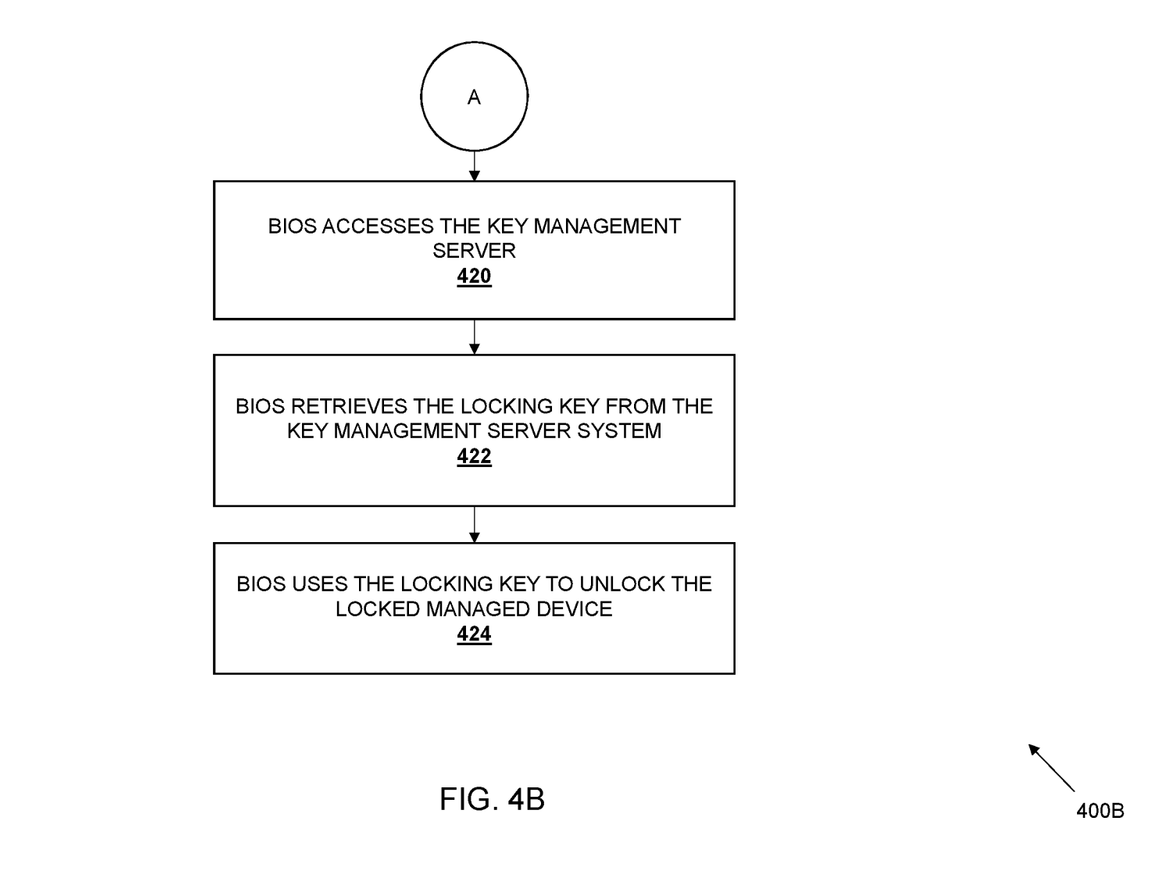

Referring now to FIGS. 4A and 4B, an embodiment of a method 400 for recovering keys in a key management system is illustrated. As discussed herein, the systems and methods of the present disclosure provide for the recovery of locking keys for managed devices in a managed system to ensure unlocking and subsequent access to those managed devices, as well as to ensure access to the managed devices when a remote access controller device in the managed system is not available to recover the locking keys for the managed devices. The systems and methods of the present disclosure may also provide for the management of key identifiers for the managed devices in order to identify and recover the locking keys from a key management server system independent of the remote access controller device.

In some embodiments, the systems and methods of the present disclosure include a managed server system with one or more managed devices and a remote access controller device. The remote access controller device is configured to store key identifiers for the managed devices in a key identifier storage (e.g. the rSPI flash drive or rSPI card described above). The remote access controller device is also configured to monitor the managed devices to detect any activity or event that may trigger retrieval of the managed devices locking keys such as, for example, the receiving of a request to access a locked managed device. Subsequently, in response to receiving the request to unlock a managed device, the remote access controller device uses the key identifier for the locked managed device to identify and retrieve a locking key for the locked managed device from a key management server system via an out-of-band network. Subsequently, the remote access controller device uses the retrieved locking key to unlock the managed device. During a boot of the managed server system where the remote access controller device is available and retrieves the locking key for the locked managed device from the key management server system via the out-of-band network, the remote access controller device may provide to a BIOS a current key management server system configuration (e.g., key management server system credentials) that is used to access the key management server system, and the BIOS may store the current key management server system configuration in a secure storage such as, for example, a key management server system configuration storage that may include the key identifier storage.

In some embodiments, when the remote access controller device included in the managed server system is unavailable to recover the locking key for the locked managed device, the BIOS included in the managed server system is configured to detect the unavailability of the remote access controller device. In response to detecting the unavailability of the remote access controller device, the BIOS may retrieve data for providing a BIOS key management client subsystem from a BIOS key management client subsystem storage, as well as retrieve the previously stored key management server system configuration (that was last used by the remote access controller device to access the key management server device) from the key management server system configuration storage. Providing the BIOS key management client subsystem and using the key management server system configuration, the BIOS may access and recover the locking key of the locked managed device from the key management server via an in-band network.

As such, the systems and methods of the present disclosure provide many benefits over conventional key recovery systems, including an automatic key recovery system provided by the automatic provisioning of the key management server system configuration by the remote access controller device to the BIOS on every boot, which allows the BIOS access to the most recent version of the key management server system configuration for use by the BIOS key management client subsystem to access the key management server system to retrieve the locking key when the remote access controller device is unavailable. As such, the systems and methods of the present disclosure provide for a reduction in managed device and/or managed system downtime, as the key recovery is automatic and requires no manual intervention from an administrator. In addition, the BIOS key management client subsystem may be an on-demand application that is loaded by the BIOS only when the remote access controller device is unavailable, which reduces the footprint of the BIOS image utilized for the BIOS. Furthermore, the key recovery system of the present disclosure provides increased performance relative to conventional key recovery systems, as the locking key is immediately recovered during a first boot after an irresponsive remote access controller device is detected.

The method 400 begins at block 402 where key identifiers for the managed devices 304a-c are obtained. In some embodiments such as, for example, during a managed boot, the first managed device locking system provided by the remote access controller device 310 queries the key management server system 202 to obtain the key identifiers for the managed devices 304a-c. For example, when accessing the key management server system 202, the remote access controller device 310 may query the key management server system 202 using a key management server system configuration that may include credentials that allow the key management client subsystem 312 to access keys stored by the key management server system 202.

The method 400 may then proceed to block 404 where the key management server system configuration is stored in a key management server system configuration storage that is accessible by the BIOS. In an embodiment, at block 404 and following successful access by the key management client subsystem 312 to the key management server system 202 to obtain the key identifiers, the remote access controller device 310 may store the key management server system configuration in the key management server system configuration storage 322 that is accessible by the BIOS 306. For example, the key management client subsystem 312 provided by the remote access controller device 310 may store the key management server system configuration in the key management server system configuration storage 322 directly, and/or may provide the key management server system configuration to the BIOS 306 so that the BIOS 306 may store the key management server system configuration in the key management server system configuration storage 322.

The method 400 may then proceed to block 406 where the key identifiers for the managed devices are stored in the key identifier storage. In an embodiment, at block 406, the key management client subsystem 312 may store the key identifiers obtained in block 402 for the managed device in key identifier storage. In some examples, the key identifier storage is provided by the key management server system configuration storage 322, while in other examples the key identifier storage may be provided by a separate key identifier storage. In some embodiments such as, for example, during a managed boot, the remote access controller device 310 may store the key identifiers obtained at block 402 for the managed devices 304a-c in the key identifier storage.

In some embodiments, at or before block 406, the managed device monitoring subsystem 314a and/or BIOS 306 may monitor the managed devices 304a-c and/or the managed server system 300 in order to detect an event or activity that triggers the retrieval of a locking key one or more of the managed devices 304a-c. For example, an event that may trigger the remote access controller device 310 to obtain a locking key for a managed device may include the detecting of a request from a user to unlock a managed device. However, in other examples, a managed device may be unlocked according to the teachings of the present disclosure after activities such as booting, startup, resetting, and/or other initializations of the managed server system 300.

The method 400 may then proceed to decision block 408 where it is determined whether an event to unlock a managed device has been detected. In some embodiments, in response to monitoring the managed devices 304a-c, the remote access controller device 310 determines whether an event to unlock a managed device has been detected (e.g., whether a request to unlock a managed device has been received, whether the managed server system Is being initialized, etc.). However, in other embodiments, the BIOS 306 may determine whether an event to unlock a managed device has been detected. The use of the BIOS 306 or the remote access controller device 310 to determine whether an event to unlock a managed device has been detected may be based on an operational status of the managed server system 300. For example, if the managed server system 300 is powered down, the remote access controller device 310 may be the only component that is operating on the managed server system 300 and capable of detecting whether the event to unlock the managed device has been detected. However, during the boot process, the BIOS 306 may be operational and is thus configured to determine (in addition to the remote access controller device 310) whether an event to unlock a managed device has been detected.

If, at decision block 408, it is determined that no event to unlock a managed device has been detected, the BIOS 306 and/or the managed device monitoring subsystem 314 continues to monitor the managed devices 304a-c and/or the managed server system 300 to detect events associated with the unlocking of a managed device and proceeds substantially as discussed above. As such, the managed device monitoring subsystem 314 and/or BIOS 306 will continue to monitor the managed devices 304a-c to detect any changes in their activities that would trigger unlocking of a managed device.

If, at decision block 408, it is determined that an event to unlock a managed device has been detected, the method 400 may then proceed to block 410 where the remote access controller device is queried to unlock the managed device. In some embodiments, a processing system in the managed server system 300 such as, for example, the BIOS 306, may send a query to the key management client subsystem 312 provided by the remote access controller device 310 to unlock the managed device. In other embodiments, the managed device monitoring subsystem 314 may send a query to the key management client subsystem 312 to unlock the managed device.

The method 400 may then proceed to decision block 412 where it is determined whether the remote access controller device 310 is operational/available. In some embodiments, a processing system in the managed server system 300 such as, for example, the BIOS 306, may determine whether the remote access controller device 310 is operational/available by, for example, sending communication requests to the remote access controller device 310 and determining whether corresponding acknowledgments are received in limited time cycles. In various examples, the remote access controller device 310 may become non-operational/unavailable if the remote access controller device 310 caches a faulty firmware, if an application running on an operating system provided by the managed server system 300 is consuming a relatively large portion of the system memory, and/or due to a variety of other reasons that one of skill in the art would recognize can cause a remote access controller device to fail or otherwise become non-operational/unavailable. As such, if the BIOS 306 does not receive an acknowledgement from the remote access controller device 310 in a limited time cycle following the sending of a communication request, the BIOS 306 may determine that the remote access controller device 310 is non-operational/unavailable.

If, at decision block 412, it is determined that the remote access controller device 310 is operational/available, the method 400 may then proceed to block 414 where the remote access controller device 310 operates to retrieve the requested locking key associated with the locked managed device. In some embodiments, the key management client subsystem 312 may use the key identifier for the locked managed device that is stored in the key identifier storage in order to identify the requested locking key in the key management server system 202. The key management client subsystem 312 may then retrieve the identified locking key via an out-of-band communication link provide by the network connection 330 through the network 204.

The method 400 may then proceed to block 416, where the locked managed device is unlocked using the retrieved locking key at block 414. In some embodiments, the RAC/storage protocol layer subsystem 318 may use the locking key that was retrieved by the remote access controller device at block 414 in order to unlock the locked managed device. Following the unlocking of the managed device, any of a variety of devices in the managed server system 300 may access data stored on the managed device. For example, the BIOS 306 may access data stored on the managed device in order to complete initialization of the managed server system 300.

The method 400 may then proceed to block 418 where the remote access controller device stores the key management server system configuration, which was used at block 414 to retrieve the locking key from the key management server system, in the key management server system configuration storage. In an embodiment of block 418, the remote access controller device 310 may update the key management server system configuration stored in the key management server system configuration storage 322 with the key management server system configuration used to retrieve the locking key at block 414 from the key management server system 202. In various embodiments, the remote access controller device 310 may update the key management server system configuration stored in the key management server system configuration storage 322 when, for example, there is a change in the key management server system configuration, when the remote access controller device 310 uses the key management server system configuration to access the key management server system 202, or at any other time that would be apparent to one of skill in the art in possession of the present disclosure, and which may be defined by a policy provided by the policy manager subsystem 316. In other embodiments, the BIOS 306 may be configured to retrieve the key management server system configuration from the remote access controller device 310 every time the BIOS 306 boots, and/or at any other predefined time that would be apparent to one of skill in the art in possession of the present disclosure, and the BIOS 306 may then provide the key management server system configuration to the key management server system configuration storage 322. In various embodiments, the key management server system configuration in the key management server system configuration storage 322 may be encrypted using a variety of encryption techniques known in the art.

If, at decision block 412, it is determined that the remote access controller device 310 is non-operational/unavailable, the method 400 proceeds to block 420 where the second managed device locking system provided by the BIOS accesses the key management server system via an in-band network. In an embodiment of block 420, the BIOS 306 may use the key management server system configuration to access the key management server system 202. In various embodiments, the BIOS 306 may use the key management server system configuration stored in the key management server system configuration storage 322 in order to access the key management server system 202 to retrieve the locking key. For example, the BIOS 306 may retrieve the data for providing the BIOS key management client subsystem from the BIOS key management client subsystem storage 324, and may use that data to load the BIOS key management client subsystem into the BIOS memory, and use the BIOS processing system to execute instructions included in that data to provide the BIOS key management client subsystem. As discussed above, the BIOS key management client subsystem may be a BIOS version of the key management client subsystem 312 used by the remote access controller device 310 to access the key management server system 202. The BIOS key management client subsystem may then use the key management server system configuration from the key management server system configuration storage 322 to access the key management server system 202. While the BIOS key management client subsystem is described as being loaded from the BIOS key management client subsystem storage 324, the BIOS key management client subsystem may be included in a BIOS image that provides the BIOS 306 while remaining within the scope of the present disclosure as well.

The method 400 may then proceed to block 422 where the BIOS retrieves the locking key from the key management server system. In an embodiment of block 422 and after using the key management server system configuration to access the key management server system 202, the BIOS 306 may obtain the locking key from the key management server system 202 for the managed device 304a, 304b, and/or 304c. For example, the BIOS key management client subsystem may query the key identifier storage to provide a key identifier associated with the locked managed device. The BIOS key management client subsystem may then read/retrieve the key identifier for the locked managed device from the key identifier storage, and provide the key identifier to the key management server system 202. In response to receiving the key identifier, the key management server system 202 may then provide the locking key to the BIOS 306 through the network 204 via an in-band communication link provided by the network connection 330.

The method 400 may then proceed to block 424 where the locking key retrieved in block 422 is used to unlock the locked managed device. In some embodiments, the BIOS 306 is configured to unlock the locked managed device using the retrieved locking key. In various embodiments of the present disclosure, the retrieval of the locking key by the BIOS 306 using key management server system configurations, and when the remote access controller device is unavailable, may be governed by a policy configuration provided by the policy manager subsystem 316. For example, the policy engine included in the policy manager subsystem 316 may provide a key recovery policy configuration, which may provide any number of key recovery schemes similar to those described herein, any of which may be selectable by an administrator. Thus, the policy manager subsystem 316 provided by the remote access controller device 310 may enable the BIOS 306 to perform the portions of the method 400 that allow the BIOS 306 to recover locking keys from the key management server system 202 when the remote access controller device 310 is unavailable.

Thus, systems and methods have been described that provide key recovery management that enables access to managed device locking keys to ensure access to managed devices in a managed server system, as well as to ensure access to the managed devices when a remote access controller is unavailable. In some embodiments, a first managed device locking system provided by a remote access controller may store key identifiers for the managed devices in a key identifier storage, and may monitor the managed devices to detect any change in their status (or other activities) that may trigger retrieval of their locking keys. In response to detecting an event that triggers retrieval of a locking key for a managed device, the remote access controller may use the key identifier for the locked managed device to identify and retrieve the locking key associated with that locked managed device from a key management server. Subsequently, the remote access controller device may use the locking key to unlock the managed device so that data stored thereon may be accessed.

However, in embodiments in which the remote access controller is not available to retrieve and provide the locking key for the locked managed device, a second managed device locking system provided by a BIOS is configured to provide a key recovery method to recover the locking key of the locked managed device from the key management server. In some embodiments, the BIOS may use a key management server system configuration to access the key management server device, with that key management server system configuration provided by the most recent key management server system configuration that was used by the remote access controller device to access the key management server device before the remote access controller device became unavailable. For example, the BIOS may retrieve data or other instructions for providing a BIOS key management client subsystem that, when loaded in the BIOS, uses the key management server system configuration to retrieve the locking keys from the key management server system. As such, the systems and methods of the present disclosure provide for the management of managed device locking keys to ensure access to managed devices, particularly when a remote access controller is unavailable. The BIOS may automatically retrieve locking keys from the key management server system when the remote access controller is unavailable, which negates the need for an administrator to manually retrieve the locking keys for the managed devices in such situations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
   a management system; and
   a managed system that is coupled to the management system through a network, wherein the managed system includes:
   a managed device;
   a management system configuration storage;
   a remote access controller device that includes a remote access controller processor and a remote access controller memory that includes instructions, when executed by the remote access controller processor, causes the remote access controller processor to:
   store a management system configuration for the management system in the management system configuration storage; and
   provide a key management client subsystem that is configured to use the management system configuration to access the management system to obtain a locking key; and
   a Basic Input/Output System (BIOS) that is coupled to the managed device, the management system configuration storage, and the remote access controller device, wherein the BIOS is configured to:
   detect an event that triggers unlocking the managed device;
   determine that the remote access controller device is unavailable and, in response, retrieve the management system configuration;
   access the management system using the management system configuration;
   retrieve the locking key from the management system; and
   unlock the managed device using the locking key.

2. The system of claim 1, wherein BIOS is configured to determine that the remote access controller device is unavailable in response to determining that the remote access controller device is at least one of non-operational and unresponsive.

3. The system of claim 1, wherein the BIOS is configured to accesses the management system via an in-band network.

4. The system of claim 1, wherein the BIOS is configured to provide a BIOS key management client subsystem that accesses the management system.

5. The system of claim 4, further comprising:
   a management client subsystem storage that is coupled to the BIOS, wherein the management client subsystem storage includes the BIOS key management client subsystem, and wherein the BIOS is configured to:
   load the BIOS key management client subsystem from the management client subsystem storage in response to the detecting the event and determining that the remote access controller device is unavailable.

6. The system of claim 1, wherein the remote access controller device includes a policy manager subsystem that includes a key recovery policy that, when active, includes instruction for the BIOS to perform key recovery when the remote access controller device is unavailable; and wherein the BIOS is configured to:
   read the instruction to perform key recovery prior to accessing the management system using the management system configuration.

7. The system of claim 1, wherein the BIOS is configured to:
   determine that the remote access controller device is available during a boot and, in response, retrieve a current management system configuration from the remote access controller device; and
   store the current management system configuration in the management system configuration storage.

8. An Information Handling System (IHS), comprising:
   a processing system; and
   a memory system that is coupled to the processing system and that includes instructions that, when executed by the processing system, causes the processing system to provide a Basic Input/Output System (BIOS) that is configured to:
   detect an event that triggers unlocking of a managed device;
   determine that a remote access controller device is unavailable, wherein the remote access controller device, when the remote access controller device is available, provides a key management client subsystem that accesses a management system using a management system configuration in order to retrieve a locking key for use in unlocking the managed device;
   retrieve, in response to detecting the event and determining that the remote access controller device is unavailable, the management system configuration;

access the management system using the management system configuration;
retrieve the locking key from the management system; and
unlock the managed device using the locking key.

9. The IHS of claim 8, wherein BIOS is configured to determine that the remote access controller device is unavailable in response to determining that the remote access controller device is at least one of non-operational and unresponsive.

10. The IHS of claim 8, wherein the BIOS is configured to accesses the management system via an in-band network.

11. The IHS of claim 8, wherein the BIOS is configured to provide a BIOS key management client subsystem that accesses the management system.

12. The IHS of claim 11, further comprising a management client subsystem storage that is coupled to the BIOS, wherein the management client subsystem storage includes the BIOS key management client subsystem, and wherein the BIOS is configured to:
load the BIOS key management client subsystem from the management client subsystem storage in response to the detecting the event and determining that the remote access controller device is unavailable.

13. The IHS of claim 8, wherein the BIOS is configured to:
receive, from a policy manager subsystem on the remote access controller device that includes an active key recovery policy, instruction to perform key recovery when the remote access controller device is unavailable; and
read the instruction to perform key recovery prior to accessing the management system using the management system configuration.

14. The IHS of claim 8, wherein the BIOS is configured to:
determine that the remote access controller device is available during a boot and, in response, retrieve a current management system configuration from the remote access controller device; and
store the current management system configuration in a management system configuration storage.

15. A method of recovering keys, comprising:
detecting, by a Basic Input/Output System (BIOS), an event that triggers unlocking a managed device;
determining, by the BIOS, that a remote access controller device is unavailable, wherein the remote access controller device, when the remote access controller device is available, provides a key management client subsystem that accesses a management system using a management system configuration in order to retrieve a locking key for use in unlocking the managed device;
retrieve, by the BIOS in response to detecting the event and determining that the remote access controller device is unavailable, the management system configuration;
accessing, by the BIOS, the management system using the management system configuration;
retrieving, by the BIOS, the locking key from the management system; and
unlocking, by the BIOS, the managed device using the locking key.

16. The method of claim 15, further comprising:
determining, by the BIOS, that the remote access controller device is unavailable in response to determining that the remote access controller device is at least one of non-operational and unresponsive.

17. The method of claim 15, further comprising:
accessing, by the BIOS, the management system via an in-band network.

18. The method of claim 15, further comprising:
providing, by the BIOS, a BIOS key management client subsystem that accesses the management system.

19. The method of claim 15, further comprising:
receiving, by the BIOS from a policy manager subsystem on the remote access controller device that includes an active key recovery policy, instruction to perform key recovery when the remote access controller device is unavailable; and
reading, by the BIOS, the instruction to perform key recovery prior to accessing the management system using the management system configuration.

20. The method of claim 15, further comprising:
determining, by the BIOS, that the remote access controller device is available during a boot and, in response, retrieve a current management system configuration from the remote access controller device; and
storing, by the BIOS, the current management system configuration in a management system configuration storage.

* * * * *